(12) United States Patent
Goto et al.

(10) Patent No.: US 10,793,139 B2
(45) Date of Patent: Oct. 6, 2020

(54) VEHICLE CONTROL APPARATUS

(71) Applicant: TOYOTA JIDOSHA KABUSHIKI KAISHA, Toyota-shi, Aichi (JP)

(72) Inventors: Jun Goto, Nagoya (JP); Kenta Kumazaki, Anjo (JP); Kazuyuki Shiiba, Miyoshi (JP); Tooru Matsubara, Toyota (JP); Masato Yoshikawa, Toyota (JP); Takahiro Kimura, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 196 days.

(21) Appl. No.: 16/046,328

(22) Filed: Jul. 26, 2018

(65) Prior Publication Data

US 2019/0061737 A1 Feb. 28, 2019

(30) Foreign Application Priority Data

Aug. 22, 2017 (JP) .................................. 2017-159806

(51) Int. Cl.
*B60W 20/30* (2016.01)
*B60W 10/00* (2006.01)
(Continued)

(52) U.S. Cl.
CPC ............. *B60W 20/30* (2013.01); *B60K 6/547* (2013.01); *B60W 10/02* (2013.01); *B60W 10/06* (2013.01);
(Continued)

(58) Field of Classification Search
CPC ...... B60W 10/00; B60W 10/02; B60W 10/08; B60W 10/11; B60W 20/00; B60W 20/30;
(Continued)

(56) References Cited

U.S. PATENT DOCUMENTS

2006/0040790 A1* 2/2006 Tohta .................. F16H 61/0403
477/98
2007/0179004 A1* 8/2007 Endo .................... F16H 61/0213
475/116
(Continued)

FOREIGN PATENT DOCUMENTS

JP 2009-166643 A 7/2009

*Primary Examiner* — Yonel Beaulieu
(74) *Attorney, Agent, or Firm* — Oliff PLC

(57) ABSTRACT

A control apparatus is provided for a vehicle that includes (i) an engine serving as a drive power source, (ii) a motor/generator serving as the drive power source and (iii) a mechanically-operated transmission mechanism that constitutes a part of a power transmitting path between the drive power source and drive wheels of the vehicle. The control apparatus includes a shift control portion is configured, when an input torque inputted to the mechanically-operated transmission mechanism is to be controlled in process of a coasting shift-down action executed in the mechanically-operated transmission mechanism, to determine an upper limit value of the input torque inputted to the mechanically-operated transmission mechanism in the process of the coasting shift-down action, such that the determined upper limit value is lower during operation of the engine than during stop of the engine.

5 Claims, 8 Drawing Sheets

(51) Int. Cl.
*B60W 10/02* (2006.01)
*B60W 10/06* (2006.01)
*B60W 10/08* (2006.01)
*B60W 10/11* (2012.01)
*F16H 61/00* (2006.01)
*B60W 30/18* (2012.01)
*F16H 61/02* (2006.01)
*B60K 6/547* (2007.10)
*F16H 61/06* (2006.01)
*F16H 61/68* (2006.01)
*F16H 61/66* (2006.01)
*F16H 59/18* (2006.01)

(52) U.S. Cl.
CPC ............ *B60W 10/08* (2013.01); *B60W 10/11* (2013.01); *B60W 30/18072* (2013.01); *F16H 61/0204* (2013.01); *F16H 61/061* (2013.01); B60W 2510/1015 (2013.01); B60W 2510/1025 (2013.01); B60W 2710/021 (2013.01); B60W 2710/1005 (2013.01); B60W 2710/1022 (2013.01); B60Y 2200/92 (2013.01); B60Y 2300/18066 (2013.01); B60Y 2300/18083 (2013.01); *F16H 61/68* (2013.01); F16H 2059/186 (2013.01); F16H 2061/6602 (2013.01)

(58) Field of Classification Search
CPC ..... B60W 30/19; B60W 30/188; F16H 61/00; F16H 61/0204; F16H 61/061; Y10T 477/00; Y10T 477/30; Y10T 477/32; Y10T 477/323; Y10T 477/33
See application file for complete search history.

(56) References Cited

U.S. PATENT DOCUMENTS

| | | | |
|---|---|---|---|
| 2007/0275819 A1* | 11/2007 | Hirata ................... | B60K 6/365 477/5 |
| 2010/0173745 A1* | 7/2010 | Hase ....................... | B60K 6/48 477/5 |
| 2011/0174559 A1* | 7/2011 | Saito ....................... | B60K 6/48 180/65.27 |
| 2012/0108384 A1* | 5/2012 | Tabata ................... | B60K 6/445 477/3 |
| 2013/0303333 A1* | 11/2013 | Jacobson ................ | B60K 6/12 477/115 |
| 2013/0304296 A1* | 11/2013 | Ueda ..................... | B60W 10/02 701/22 |
| 2015/0314777 A1* | 11/2015 | Koike .................... | B60K 6/442 701/22 |
| 2015/0353071 A1* | 12/2015 | Tanishima ........... | B60W 10/115 701/22 |
| 2017/0247027 A1* | 8/2017 | Nefcy ................. | B60W 50/082 |
| 2018/0229934 A1* | 8/2018 | Hazim .................... | F16G 1/28 |

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2017-159806 filed on Aug. 22, 2017, the disclosure of which is herein incorporated by reference in its entirety.

FIELD OF THE INVENTION

The present invention relates to a control apparatus for a vehicle including a drive power source (such as engine and motor/generator) and a mechanically-operated transmission mechanism that is configured to transmit a drive force of the drive power source.

BACKGROUND OF THE INVENTION

There is known a control apparatus for a vehicle that includes (i) an engine serving as a drive power source, (ii) a motor/generator serving as the drive power source and (iii) a mechanically-operated transmission mechanism that constitutes a part of a power transmitting path between the drive power source and drive wheels of the vehicle. A control apparatus for a vehicle power transmitting system, which is disclosed in JP-2009-166643A, is an example of this type of control apparatus. This document discloses a technique relating to an input torque inputted to an automatic transmission (corresponding to the above-described mechanically-operated transmission mechanism) provided in a vehicle having a drive power source in the form of an engine and a second motor/generator (corresponding to the above-described motor/generator), particularly, a technique of the controlling the input torque such that, when a coasting shift-down action to establish a first speed gear position in the automatic transmission by engagement of an engagement device is executed, the input torque is increased by increase of an output torque of the second motor/generator connected to an input shaft of the automatic transmission, whereby an input rotating speed of the automatic transmission is increased toward a post-shifting synchronizing rotating speed at the first speed gear position, and then the engagement device is engaged by increase of an engaging pressure of the engagement device as the input rotating speed reaches a target rotating speed, whereby the engagement device is completely engaged. This document discloses also that, when the output torque of the second motor/generator is to be increased, if there is a limitation on an electric power that is to be discharged from a battery to be supplied to the second motor/generator, an electric power generated in a first motor/generator by the drive force of the engine, in addition to the electric power supplied from the battery, is supplied to the second motor/generator.

SUMMARY OF THE INVENTION

By the way, a vehicle, which is equipped with the drive power source in the form of an engine and a motor/generator, is capable of running in a state in which at least the engine is operated, and also by a drive force of the motor/generator in a state in which the engine is stopped. An inertia of the engine varies depending on whether the engine is operated or stopped. Therefore, in process of a coasting shift-down action to establish a certain gear position in the mechanically-operated transmission mechanism, even if there is no substantial difference in a controlled value of the input torque inputted to the mechanically-operated transmission mechanism, the input rotating speed of the mechanically-operated transmission mechanism is changed in a manner that could vary depending on whether the engine is operated or stopped, at a stage at which the input rotating speed is increased toward the post-shifting synchronizing rotating speed at the certain gear position that is to be established by the shift-down action. Thus, depending on an operating state of the engine (i.e., whether the engine is operated or stopped), the input rotating speed of the mechanically-operated transmission mechanism in the process of the shift-down action is not necessarily changed in a targeted manner, whereby a shock could be generated or increased.

The present invention was made in view of the background art described above. It is therefore an object of the present invention to provide a control apparatus for a vehicle, which is capable of restraining shock irrespective of an operating state of an engine of the vehicle upon execution of a coasting shift-down action in a mechanically-operated transmission mechanism of the vehicle.

The object indicated above is achieved according to the following modes of the present invention.

According to a first mode of the invention, there is provided a control apparatus for a vehicle that includes (i) an engine serving as a drive power source, (ii) a motor/generator serving as the drive power source and (iii) a mechanically-operated transmission mechanism that constitutes a part of a power transmitting path between the drive power source and drive wheels of the vehicle. The control apparatus includes a shift control portion is configured, when an input torque inputted to the mechanically-operated transmission mechanism is to be controlled in process of a coasting shift-down action executed in the mechanically-operated transmission mechanism, to determine an upper limit value of the input torque inputted to the mechanically-operated transmission mechanism in the process of the coasting shift-down action, such that the determined upper limit value is lower during operation of the engine than during stop of the engine. The control apparatus may further includes a drive-power source control portion configured, in the process of the coasting shift-down action, to control the input torque inputted to the mechanically-operated transmission mechanism, by controlling a torque of the drive power source in accordance with commands supplied from the shift control portion.

According to a second aspect of the invention, in the control apparatus according to the first mode of the invention, the mechanically-operated transmission mechanism is an automatic transmission configured to establish each of a plurality of gear positions by engagement of at least one of a plurality of engagement devices including an one-way clutch. The coasting shift-down action is a shift-down action to establish one of the plurality of gear positions in the mechanically-operated transmission mechanism, by either (i) release of a releasing engagement device as one of the engagement devices and engagement of the one-way clutch as another one of the engagement devices, or (ii) the release of the releasing engagement device and engagement of still another one of the engagement devices that is disposed in parallel with the one-way clutch. When the coasting shift-down action is to be executed, the shift control portion is configured to cause the releasing engagement device to be released, and to make a torque of the drive power source temporarily higher than a required value so as to temporarily increase the input torque inputted to the mechanically-operated transmission mechanism, for thereby increasing an input rotating speed of the mechanically-operated transmission mechanism toward a synchronizing rotating speed at the one of the plurality of gear positions, such that the shift control portion causes the still another one of the engagement devices to be engaged as the input rotating speed of the mechanically-operated transmission mechanism reaches a predetermined rotating speed.

According to a third aspect of the invention, in the control apparatus according to the second mode of the invention, when the coasting shift-down action is to be executed, the shift control portion is configured to reduce the temporarily increased input torque inputted to the mechanically-operated transmission mechanism as the input rotating speed of the mechanically-operated transmission mechanism reaches a second predetermined rotating speed that is lower than the predetermined rotating speed, such that the upper limit value of the input torque upon reduction of the input torque is lower during operation of the engine than during stop of the engine. The control apparatus may further includes a drive-power source control portion configured, in the process of the coasting shift-down action, to control the input torque inputted to the mechanically-operated transmission mechanism, by controlling the torque of the drive power source in accordance with commands supplied from the shift control portion, such that the input torque is temporarily increased and then reduced to be not higher than the upper limit value that is determined, by the shift control portion, to be lower during operation of the engine than during stop of the engine.

According to a fourth aspect of the invention, in the control apparatus according to any one of the first through third aspects of the invention, the vehicle includes an electrically-controlled transmission mechanism including a differential mechanism to which the engine is connected in a power transmittable manner, and a first motor generator connected to the differential mechanism, such that a differential state of the differential mechanism is controlled with an operating state of the first motor/generator being controlled. The motor/generator serving as the drive power source is a second motor/generator that is connected to an output rotary member of the electrically-controlled transmission mechanism in a power transmittable manner.

According to the first mode of the invention, when the input torque inputted to the mechanically-operated transmission mechanism is to be controlled in process of the coasting shift-down action executed in the mechanically-operated transmission mechanism, the upper limit value of the input torque inputted to the mechanically-operated transmission mechanism is determined to be lower during operation of the engine than during stop of the engine. Thus, even during operation of the engine during which the input rotating speed of the mechanically-operated transmission mechanism in the process of the coasting shift-down action of the mechanically-operated transmission mechanism could be easily increased as compared with during stop of the engine, it is possible to cause the input rotating speed to be changed in substantially the same manner as during stop of the engine, for example, increased at substantially the same rate as during stop of the engine. It is therefore possible to restrain shock irrespective of the operating state of the engine in execution of the coasting shift-down action in the mechanically-operated transmission mechanism.

According to the second mode of the invention, in execution of the coasting shift-down action to establish one of the plurality of gear positions in the mechanically-operated transmission mechanism, by either (i) release of the releasing engagement device as one of the engagement devices and engagement of the one-way clutch as another one of the engagement devices, or (ii) the release of the releasing engagement device and engagement of still another one of the engagement devices that is disposed in parallel with the one-way clutch, the releasing engagement device is released, and the torque of the drive power source is made temporarily higher than a required value so as to temporarily increase the input torque inputted to the mechanically-operated transmission mechanism, whereby the input rotating speed of the mechanically-operated transmission mechanism is increased toward a synchronizing rotating speed at the above-described one of the plurality of gear positions, such that the above-described still another one of the engagement devices is engaged as the input rotating speed of the mechanically-operated transmission mechanism reaches the predetermined rotating speed. Thus, the coasting shift-down action to establish the above-described one of the gear positions can be appropriately progressed. Further, at a stage of the temporary increase of the input torque inputted to the mechanically-operated transmission mechanism in process of the coasting shift-down action to establish the above-described one of the gear positions, the input rotating speed of the mechanically-operated transmission mechanism could be easily increased during operation of the engine as compared with during stop of the engine. Thus, during operation of the engine, shock (particularly, synchronization shock) is likely to be caused due to engagement of the one-way clutch when the input rotating speed is synchronized with a post-shifting synchronizing rotating speed before engagement of the above-described still another one of the engagement devices. However, according to the second mode of the invention, in the process of the coasting shift-down action, the input torque is controlled with the upper limit value of the input torque being set to be lower during operation of the engine than during stop of the engine, so that, during operation of the engine, it is possible to cause the input rotating speed of the mechanically-operated transmission mechanism to be changed in substantially the same manner as during stop of the engine, for example, increased at substantially the same rate as during stop of the engine, whereby generation of the synchronization shock can be restrained.

According to the third aspect of the invention, when the coasting shift-down action to establish the above-described one of the gear positions is to be executed, the temporarily increased input torque inputted to the mechanically-operated transmission mechanism is reduced as the input rotating speed of the mechanically-operated transmission mechanism reaches the second predetermined rotating speed that is lower than the predetermined rotating speed. Thus, owing to the reduction of the input torque after the temporary increase of the input torque, a rate of increase of the input rotating speed of the mechanically-operated transmission mechanism is made slow for restraining generation of the synchronization shock, which could take place if the input torque were kept increased without the reduction. Further, according to the third aspect of the invention, the upper limit value of the input torque upon the reduction of the input torque is set to be lower during operation of the engine than during stop of the engine, so that, during operation of the engine, it is possible to cause the input rotating speed of the mechanically-operated transmission mechanism to be changed in substantially the same manner as during stop of the engine, for example, increased at substantially the same rate as during stop of the engine, whereby generation of the synchronization shock can be appropriately restrained.

According to the fourth aspect of the invention, in the control apparatus for the vehicle including the electrically-controlled transmission mechanism and the mechanically-operated transmission mechanism are connected in series with each other, it is possible to restrain shock irrespective of the operating state of the engine in execution of the coasting shift-down action in the mechanically-operated transmission mechanism.

DETAILED DESCRIPTION OF PREFERRED EMBODIMENTS

Hereinafter, some embodiments of the invention will be described in detail with reference to the accompanying drawings.

First Embodiment

Figure 1:
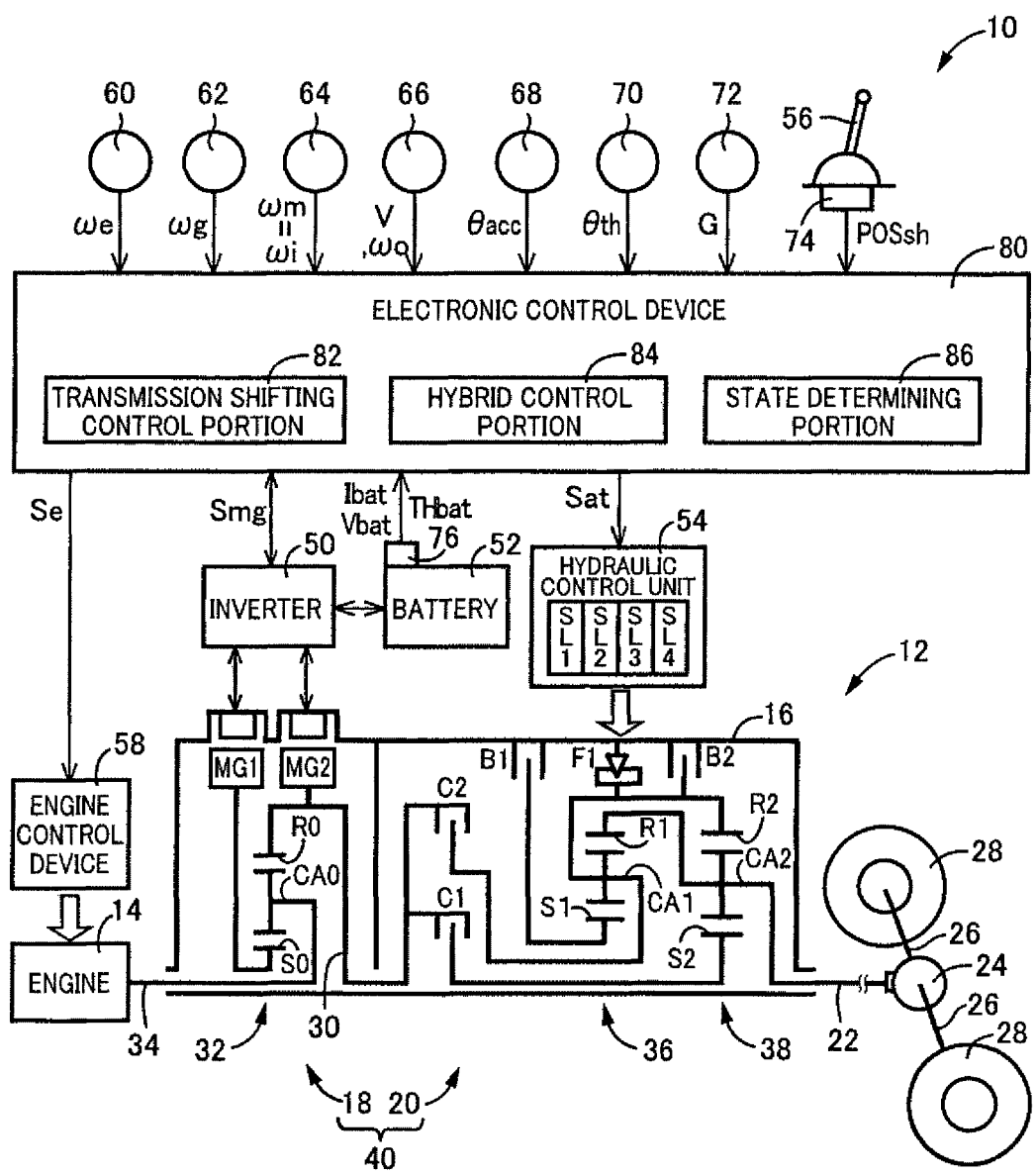
FIG. 1 is a schematic view showing an arrangement of a drive system of a vehicle to be controlled by a control apparatus according to the present invention, and major control functions and control portions of the control apparatus.

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 serving as a drive power source, an electrically-controlled continuously-variable transmission portion 18 (hereinafter referred to as "continuously-variable transmission portion 18") connected directly or indirectly via a damper (not shown) or any other device to the engine 14, and a mechanically-operated step-variable transmission portion 20 (hereinafter referred to as "step-variable transmission portion 20) connected to an output rotary member of the continuously-variable transmission portion 18. The continuously-variable transmission portion 18 and the step-variable transmission portion 20 are disposed in series with each other within a transmission casing 16 (hereinafter referred to as "casing 16") serving as a non-rotatable member fixed to a body of the vehicle 10, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously-variable transmission portion 18 and the step-variable transmission portion 20 are constructed substantially symmetrically with each other about the axis of the engine 14 (about the above-indicated common axis), and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te which is an output torque of this engine 14, is controlled by an electronic control device 80 (described below) which controls the operating condition of the engine 14 as represented by an opening angle θth of a throttle valve or an intake air quantity, an amount of injection of a fuel and an ignition timing. In the present embodiment, the engine 14 is connected to the continuously-variable transmission portion 18, without a fluid-operated type power transmitting device such as a torque converter or a fluid coupling being disposed between the engine 14 and the transmission portion 18.

The continuously-variable transmission portion 18 is provided with: a first motor/generator (first rotating machine) MG1; a differential mechanism 32 serving as a power distributing device to mechanically distribute the drive force of the engine 14 to the first motor/generator MG1, and to an intermediate power-transmitting member 30 that is an output rotary member of the continuously-variable transmission portion 18; and a second motor/generator (second rotating machine) MG2 connected to the intermediate power-transmitting member 30 in a power transmittable manner. The continuously-variable transmission portion 18 is an electrically-controlled continuously-variable transmission wherein a differential state of the differential mechanism 32 is controllable by controlling an operating state of the first motor/generator MG1. The first motor/generator MG1 serves as a differential motor/generator (differential electric motor) while the second motor/generator MG2 is an electric motor that serves as a drive power source, namely, a vehicle driving motor/generator (vehicle driving electric motor). The vehicle 10 is a hybrid vehicle provided with the drive power source in the form of the engine 14 and the second motor/generator MG2.

Each of the first motor/generator MG1 and the second motor/generator MG2 is an electrically-operated rotary device having a function of an electric motor and a function of an electric generator. The first motor/generator MG1 and the second motor/generator MG2 are connected to an electric-power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided in the vehicle 10 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is connected to the engine 14 through a connecting shaft 34 in a power transmittable manner, and the sun gear S0 is connected to the first motor/generator MG1 in a power transmittable manner, while the ring gear R0 is connected to the second motor/generator MG2 in a power transmittable manner. In the differential mechanism 32, the carrier CA0 serves as an input rotary element, and the sun gear S0 serves as a reaction rotary element, while the ring gear R0 serves as an output rotary element.

The step-variable transmission portion 20 is a mechanically-operated transmission mechanism which constitutes a part of a power transmitting path between the intermediate power-transmitting member 30 and the drive wheels 28. The intermediate power-transmitting member 30 also serves as an input rotary member of the step-variable transmission portion 20. The step-variable transmission portion 20 is considered to also constitute a part of a power transmitting path between the drive power source (second motor/generator MG2 or engine 14) and the drive wheels 28, since the second motor/generator MG2 is connected to the intermediate power-transmitting member 30 such that the intermediate power-transmitting member 30 is rotated together with the second motor/generator MG2, or since the engine 14 is connected to an input rotary member of the continuously-variable transmission portion 18. The step-variable transmission portion 20 is a known automatic transmission of a planetary gear type which is provided with a plurality of planetary gear sets in the form of a first planetary gear set 36 and a second planetary gear set 38, and a plurality of engagement devices E including a one-way clutch F1 (e.g., sprag clutch), a clutch C1, a clutch C2, a brake B1 and a brake B2. Hereinafter, the clutch C1, clutch C2, brake B1 and brake B2 will be referred to as "coupling devices CB" unless otherwise specified.

Each of the coupling devices CB is a hydraulically operated frictional coupling device in the form of a multiple-disc type or a single-disc type clutch or brake that is to be pressed by a hydraulic actuator, or a band brake that is to be tightened by a hydraulic actuator. The coupling devices CB are selectively placed in engaged, slipped or released states with their torque capacities (engaging torque values or transmitted torque values). Tcb being changed according to engaging hydraulic pressures PRcb applied thereto, which are regulated by respective solenoid-operated valves SL1-SL4 incorporated within a hydraulic control unit 54 provided in the vehicle 10. In order for each coupling device CB to be able to transmit a torque (for example, an AT input torque Ti which is an input torque of the step-variable transmission portion 20) between the intermediate power-transmitting member 30 and the output shaft 22, without a slipping action (without a speed difference between input and output elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (transmitted torque) to be transmitted through an engaging action of the coupling device CB. However, it is noted that an increase of the engaging torque Tcb enough to obtain the transmitted torque does not cause an increase of the transmitted torque. That is, the engaging torque Tcb is equivalent to a maximum value of the torque that can be transmitted through the coupling device CB, and the transmitted torque is equivalent to the torque that is actually transmitted through the coupling device CB. It is noted that the engaging torque (transmitted torque) Tcb and the engaging hydraulic pressure PRcb are substantially proportional to each other, except at a stage the engaging hydraulic pressure PRcb is raised to initiate an engaging contact of the input and output elements with each other.

Basically, the one-way clutch F1 is placed automatically in its engaged state when the drive power source is in its driving state in which the AT input torque Ti is a positive value, and is placed automatically in its released state when the drive power source is in its driven state in which the AT input torque Ti is a negative value.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power-transmitting member 30, casing 16 or output shaft 22, either directly or indirectly (selectively) through the coupling devices CB or the one-way clutch F1.

The step-variable transmission portion 20 is shifted to a selected one of four AT gear positions (speed positions) by engaging actions of selected ones of the engagement devices E. These four AT gear positions have respective different gear ratios (speed ratios) γat (=AT input rotating speed $\omega i$/AT output rotating speed $\omega o$). Namely, the step-variable transmission portion 20 is shifted up and down from one gear position to another by placing selected ones of the coupling devices E in the engaged state. The AT input rotating speed $\omega i$ is a rotating speed (angular velocity) of the input rotary member of the step-variable transmission portion 20, that is, a rotating speed of the intermediate power-transmitting member 30, which is equal to an MG2 rotating speed $\omega m$ that is an rotating speed of the second motor/generator MG2. Thus, the AT input rotating speed $\omega i$ can be represented by the MG2 rotating speed $\omega m$. The AT output rotating speed $\omega o$ is a rotating speed of the output shaft 22 of the step-variable transmission portion 20, which is considered to be an output speed of a transmission device 40 which consists of the continuously-variable transmission portion 18 and the step-variable transmission portion 20.

Figures 2, 3:
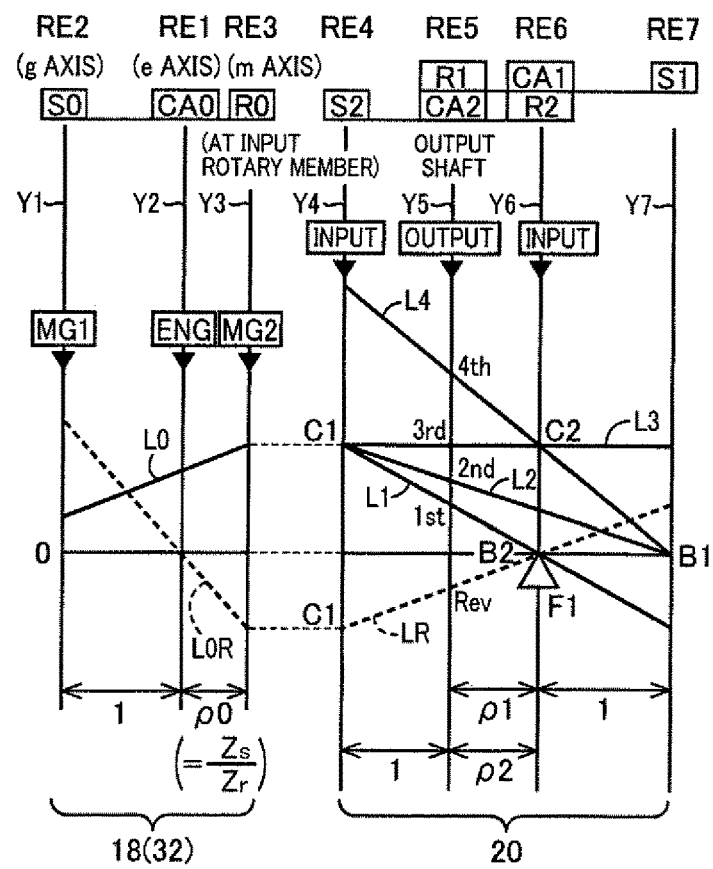
FIG. 2 is a table indicating a relationship between gear positions of a mechanically-operated step-variable transmission portion shown in FIG. 1 and combinations of engagement devices placed in engaged states to establish the respective gear positions.
FIG. 3 is a collinear chart indicating a relationship among rotating speeds of rotary elements of an electrically-controlled continuously-variable transmission portion and the mechanically-operated step-variable transmission portion.

Reference is now made to FIG. 2, which is the table indicating the relationship between the first through fourth speed AT gear positions of the step-variable transmission portion 20 shown in FIG. 1 and combinations of the engagement devices E placed in the engaged states to establish the respective AT gear positions. In the table, the four forward AT gear positions are respectively represented by "1st", "2nd", "3rd" and "4th". The first speed AT gear position "1st" is the lowest-speed gear position having a highest gear ratio γat, while the fourth speed AT gear position "4th" is the highest-speed gear position having a lowest gear ratio γat. The gear ratio γat decreases in the direction from the first speed AT gear position (lowest-speed gear position) "1st" toward the fourth speed AT gear position (highest-speed gear position) "4th". In the table, "O" indicates the engaged state of the engagement devices E, "Δ" indicates the engaged state of the brake B2 during application of an engine brake to the vehicle 10 or during a coasting shift-down action of the step-variable transmission portion 20 (i.e., a shift-down action of the step-variable transmission portion 20 while the vehicle 10 is in coasting run), and the blank indicates the released state of the engagement devices E. The first speed AT gear position "1st" is established by engagement of the one-way clutch F1, and is established also by engagement of the brake B2 in place of the engagement of the one-way clutch F1. The brake B2 is disposed in parallel with the one-way clutch F1. For example, when the vehicle 10 is started or accelerated, the brake B2 is not required to be placed in the engaged state, and the first speed AT gear position "1st" is established by engagement of the clutch C1 and automatic engagement of the one-way clutch F1.

The shift-down action of the step-variable transmission portion 20 in coasting run of the vehicle 10 is a kind of a "power-off shift-down action" that is required as a result of reduction of a vehicle-speed-related value (vehicle running speed V, for example) due to reduction of a required drive force (as represented by an operation degree θacc of an accelerator pedal) or during decelerating run of the vehicle 10 in a released position of the accelerator pedal (with the operation degree θacc of the accelerator pedal being zero or substantially zero), and is a shift-down action that is required during decelerating run of the vehicle 10 in the released position of the accelerator pedal. It is noted that the step-variable transmission portion 20 is placed in a neutral position, i.e., in a power transmission cutoff state when all of the engagement devices E are placed in the released states.

The step-variable transmission portion 20 is shifted up or down to establish a newly selected one of the four AT gear positions, according to the operation degree θacc of the accelerator pedal and the vehicle running speed V, with a releasing action of one of the engagement devices E (that include the coupling devices CB) and an engaging action of another one of the engagement devices E, which are controlled by the electronic control device 80, more specifically, by a transmission shifting control portion 82 configured to control shifting actions of the step-variable transmission portion 20. The above-indicated one engagement device E (i.e., releasing engagement device) was placed in the engaged state before the step-variable transmission portion 20 is shifted to establish the newly selected AT gear position, while the above-indicated another engagement device E (i.e., engaging engagement device) is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, releasing and engaging actions of the selected two engagement devices E.

For instance, the step-variable transmission portion 20 is shifted down from the second speed AT gear position "2nd" to the first speed AT gear position "1st", with the release of the brake B1 and the engagement of the brake B2, as indicated in the table of FIG. 2. In this instance, the hydraulic pressures applied to the brakes B1 and B2 are transiently controlled to bring these brakes B1 and B2 into the released and engaged states, respectively. The releasing engagement device is one of the engagement devices E which is involved in a shifting action of the step-variable transmission portion 20 and which is to be released in process of the shifting action of the step-variable transmission portion 20. The engaging engagement device is one of the engagement devices E which is involved in a shifting action of the step-variable transmission portion 20 and which is to be engaged in process of the shifting action of the step-variable transmission portion 20. It is noted that the step-variable transmission portion 20 is shifted down from the second speed AT gear position "2nd" to the first speed AT gear position "1st", also with the release of the brake B1 as the releasing engagement device and the engagement of the one-way clutch F1 that is automatically made after the release of the brake B1, as indicated in the table of FIG. 2.

The collinear chart of FIG. 3 indicates a relationship among rotating speeds of the rotary elements of the continuously-variable transmission portion 18 and the step-variable transmission portion 20. In this collinear chart, three vertical lines Y1, Y2 and Y3 corresponding to the respective three rotary elements of the differential mechanism 32 of the continuously-variable transmission portion 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input rotating speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously-variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power-transmitting member 30. Thus, a rotary motion of the engine 14 is transmitted to the step-variable transmission portion 20 through the intermediate power-transmitting member 30. In a part of the collinear chart corresponding to the continuously-variable transmission portion 18, each of straight lines L0 and L0R intersecting the vertical line Y2 represents a relationship between the rotating speeds of the sun gear S0 and the ring gear R0.

The step-variable transmission portion 20 is arranged such that the fourth rotary element RE4 is selectively connected to the intermediate power-transmitting member 30 through the clutch C1, the fifth rotary element RE5 is connected to the output shaft 22, the sixth rotary element RE6 is selectively connected to the intermediate power-transmitting member 30 through the clutch C2 and is selectively connected to the casing 16 through the brake B2 or the one-way clutch F1, and the seventh rotary element RE7 is selectively connected to the casing 16 through the brake B1. In a part of the collinear chart corresponding to the step-variable transmission portion 20, straight lines L1, L2, L3 and L4 intersecting the vertical line Y5 represent the rotating speeds of the output shaft 22 in the respective first, second, third and fourth speed AT gear positions "1st", "2nd", "3rd" and "4th" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque that is a negative torque generated by the first motor/generator MG1 operated in the positive direction is applied to the sun gear S0, a directly transmitted engine torque Td $(=Te/(1+\rho)=-(1/\rho)*Tg)$ that is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to required vehicle drive force. At this time, the first motor/generator MG1 serves as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is, applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely rotatable in the negative direction. Namely, in the motor drive mode, the engine 14 is held in non-operated state, so that an rotating speed ωe of the engine 14 (engine rotating speed ωe) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear position.

Broken straight lines L0R and LR shown in the collinear chart of FIG. 3 indicate the relative rotating speeds of the rotary elements in a motor drive mode in which the vehicle 10 is driven in the rearward direction. During driving of the vehicle 10 in the rearward direction in this motor drive mode, the MG2 torque Tm which is a negative torque generated by the second motor/generator MG2 operated in the negative direction is applied to the ring gear R0, and is transmitted to the drive wheels 28 as a drive torque to drive the vehicle 10 in the rearward direction, through the step-variable transmission portion 20 placed in the first AT gear position. To drive the vehicle 10 in the rearward direction, the electronic control device 80 (particularly, a hybrid control portion 84 configured to control running of the vehicle 10) described below is configured to command the second motor/generator MG2 to be rotated in a direction opposite to a direction during the forward running, so as to generate the reverse driving MG2 torque Tm (negative reverse driving torque) opposite to the forward driving MG2 torque Tm (positive forward driving torque), while the step-variable transmission portion 20 is placed in a low-speed AT gear position (first speed AT gear position, for example). Thus, the vehicle 10 is driven in the rearward direction with the negative MG2 torque Tm while the step-variable transmission portion 20 is placed in one of the forward driving AT gear positions. In the hybrid drive mode, too, the second motor/generator MG2 can be rotated in the negative direction as indicated by the straight line L0R, so that the vehicle 10 can be driven in the rearward direction in the hybrid drive mode, as well as in the motor drive mode.

In the vehicular drive system 12, the continuously-variable transmission portion 18 serves as an electrically-controlled shifting mechanism (electrically-controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power-transmitting member 30 is connected (in other words, to which the second motor/generator MG2 is operatively connected). Namely, the continuously-variable transmission portion 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously-variable transmission portion 18 is operated as an electrically-controlled continuously-variable transmission a gear ratio γ0 (=ωe/ωm) of which is variable. The gear ratio is a ratio of rotating speed of the connecting shaft 34 (namely, engine rotating speed ωe) to the rotating speed of the intermediate power-transmitting member 30 (namely, MG2 rotating speed ωm).

In the hybrid drive mode, for instance, the rotating speed of the sun gear S0 is increased, or reduced by controlling the rotating speed of the first motor/generator MG1 while the rotating speed of the ring gear R0 is determined by the rotating speed of the drive wheels 28 with the step-variable transmission portion 20 placed in one of the AT gear positions, so that the rotating speed of the carrier CA0 (namely, engine rotating speed ωe) is accordingly increased or reduced. In running with operation of the engine 14, therefore, the engine 14 can be operated at an efficient operating point. That is, the step-variable transmission portion 20 to be placed in a selected one of the AT gear positions and the continuously-variable transmission portion 18 serving as a continuously-variable transmission cooperate to provide the transmission device 40 in which the continuously-variable transmission portion 18 (differential mechanism 32) and the step-variable transmission portion 20 are disposed in series with each other and which serves as a continuously-variable transmission as a whole.

Alternatively, the continuously-variable transmission portion 18 can be shifted like a step-variable transmission. Accordingly, the transmission device 40 constituted by the step-variable transmission portion 20 to be placed in one of the AT gear positions and the continuously-variable transmission portion 18 which can be shifted like the step-variable transmission can be shifted like a step-variable transmission as a whole. That is, the step-variable transmission portion 20 and the continuously-variable transmission portion 18 can be controlled to selectively establish a plurality of speed positions (hereinafter referred to as "overall speed positions" although it may be referred also to as "conceptual speed positions") having respective different values of a gear ratio γt (=ωe/ωo) which is a ratio of the engine rotating speed ωe to the output speed ωo. The gear ratio γt is an overall gear ratio of the transmission device 40 consisting of the continuously-variable transmission portion 18 and the step-variable transmission portion 20 which are disposed in series with each other. The overall gear ratio γt is equal to a product of the gear ratio γ0 of the continuously-variable transmission portion 18 and the gear ratio γat of the step-variable transmission portion 20, namely, γt=γ0*γat.

Figures 4, 5:
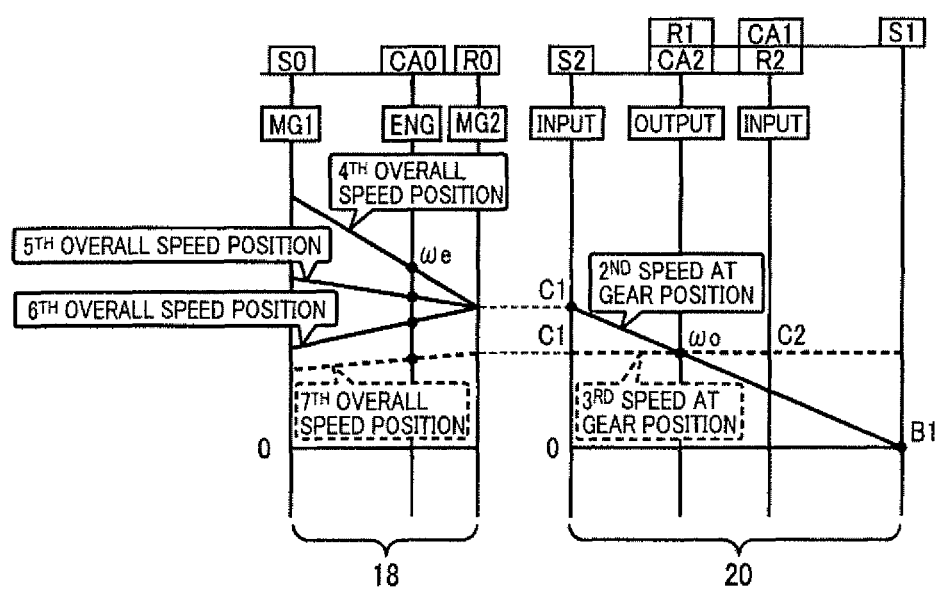
FIG. 4 is a table indicating an example of a plurality of overall speed positions of a transmission device in relation to the gear positions of the step-variable transmission portion.
FIG. 5 is a view indicating some examples of the gear positions of the step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different gear ratio values γ0 of the continuously-variable transmission portion 18. FIG. 4 is the table indicating an example of the overall speed positions of the transmission device 40, wherein first through third overall speed positions are established for the first speed AT gear position, fourth through sixth overall speed positions are established for the second speed AT gear position, seventh through ninth overall speed positions are established for the third speed AT gear position, and a tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In FIG. 5, solid lines indicate the fourth through sixth overall speed positions established when the step-variable transmission portion 20 is placed in the second speed AT gear position. In the transmission device 40, the continuously-variable transmission portion 18 is controlled to control the engine rotating speed ωe with respect to the output speed ωo for establishing the predetermined overall gear ratio values γt, to thereby establish the different overall speed position or positions for each of the AT gear positions. A broken line indicates the seventh overall speed position established when the step-variable transmission portion 20 is placed in the third speed AT gear position. In the transmission device 40, the continuously-variable transmission portion 18 is controlled according to the selected one of the AT gear positions, for shifting the transmission device 40 from one of the overall speed positions to another.

Referring back to FIG. 1, the vehicle 10 is provided with the control apparatus in the form of the electronic control device 80 configured to control various devices of the vehicle 10 such as the engine 14, continuously-variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals from various sensors provided on the vehicle 10, such as: an output signal of an engine speed sensor 60 indicative of the engine speed ωe; an output signal of an MG1 speed sensor 62 indicative of the MG1 speed ωg which is the rotating speed of the first motor/generator MG1; an output signal of an MG2 speed sensor 64 indicative of the MG2 speed ωm that is the AT input rotating speed ωi; an output signal of an output speed sensor 66 indicative of the output speed ωo corresponding to the vehicle running speed V; an output signal of an accelerator-pedal operation degree sensor 68 indicative of the operation degree θacc of a vehicle-acceleration operation member in the form of the accelerator pedal, which operation degree θacc represents a degree of acceleration of the vehicle 10 required by the vehicle operator; an output signal of a throttle valve opening angle sensor 70 indicative of an angle θth of opening of an electronic throttle valve; an output signal of an acceleration sensor 72 indicative of a longitudinal acceleration value G of the vehicle 10; an output signal of a shift position sensor 74 indicative of an operating position POSsh of a manually operated shifting member in the form of a shift lever 56 provided on the vehicle 10; an output signal of a battery sensor 76 indicative of a temperature THbat; and a charging/discharging electric current Ibat and a voltage Vbat of the battery 52. Further, the electronic control device 80 generates various output signals to the various devices provided in the vehicle 10, such as: an engine control command signal Se to be applied to an engine control device 58 provided to control a throttle actuator, an fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54, for controlling the operating states of the coupling devices CB (namely, for controlling the shifting actions of the step-variable transmission portion 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current or a drive voltage corresponding to the hydraulic pressure command value, so that the outputted drive current or voltage is supplied to the hydraulic control unit 54.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, based on, for example, the temperature THbat and the charging state SOC of the battery 52, a maximum charging amount Win of electric power that can be charged to the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decrease with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a shift control means or portion in the form of a transmission shifting control portion 82, and a hybrid control means or portion in the form of a hybrid control portion 84, for performing various controls in the vehicle 10. It is noted that the hybrid control portion 84 serves also as a drive-power source control portion.

The transmission shifting control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above is a predetermined relationship between two variables in the form of the output speed ωo (equivalent to the vehicle running speed V) and the accelerator-pedal operation degree θacc (equivalent to a required drive torque Tdem and the throttle valve opening angle θth), which relationship is used to determine a shifting action of the step-variable transmission portion 20 and is represented by shift-up and shift-down shifting lines in a two-dimensional coordinate system in which the output speed ωo and the accelerator-pedal operation degree θacc are taken along respective two axes. The shifting lines in the AT gear position shifting map consist of shift-up lines (indicated by solid lines in FIG. 6) for determining a shift-up action of the step-variable transmission portion 20, and shift-down lines (indicated by broken lines in FIG. 6) for determining a shift-down action of the step-variable transmission portion 20. Each of the shifting lines is defined by a series of shifting points which are determined such that the step-variable transmission portion 20 should be shifted up or down when the output speed ωo becomes higher or lower than the shifting point at a given value of the accelerator-pedal operation degree θacc or the regenerative torque, or when the accelerator-pedal operation degree θacc or the regenerative torque becomes larger or smaller than the shifting point at a given value of the output speed ωo.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator-pedal operation degree θacc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signals Smg to control the first motor/generator MG1 and the second motor/generator MG2, for establishing the required vehicle drive power Pdem. For example, the engine control command signal Se represents a command value of an engine power Pe which is a power of the engine 14 outputting the torque Te at its present rotating speed ωe. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed ωg, and an electric power amount Wm to be consumed by the second motor/generator MG2 to generate the MG2 torque Tm at the present MG2 rotating speed ωm.

When the transmission device 40 as a whole is operated as the continuously-variable transmission with the continuously-variable transmission portion 18 being operated as the continuously-variable transmission, for instance, the hybrid control portion 84 controls the engine 14 and the electric power amount Wg to be generated by the first motor/generator MG1, so as to establish the engine rotating speed ωe and the engine torque Te for obtaining the engine power Pe to establish the required vehicle drive power Pdem, while taking account of a highest fuel economy point of the engine 14, so that the gear ratio γ0 of the continuously-variable transmission portion 18 is controlled so as to be continuously varied. As a result, the gear ratio γt of the transmission device 40 is controlled while the continuously-variable transmission portion 18 is operated as the continuously-variable transmission.

When the transmission device 40 as a whole is operated as the step-variable transmission with the continuously-variable transmission portion 18 being operated as the step-variable transmission, for instance, the hybrid control portion 84 determines a shifting action of the transmission device 40 according to an overall speed-position shifting map, for example, and performs a shifting control of the continuously-variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first motor/generator MG1 to control the engine rotating speed ωe according to the output speed ωo so as to maintain the respective gear ratio values γt. It is noted that the gear ratio γt in each of the overall speed positions does not necessarily have to be constant over all ranges of the output speed ωo, but may be changed in a certain range or ranges of the output speed ωo or may be given a limitation or limitations, for example, depending on upper and lower limits of rotating speeds of respective rotatable elements.

Figure 6:
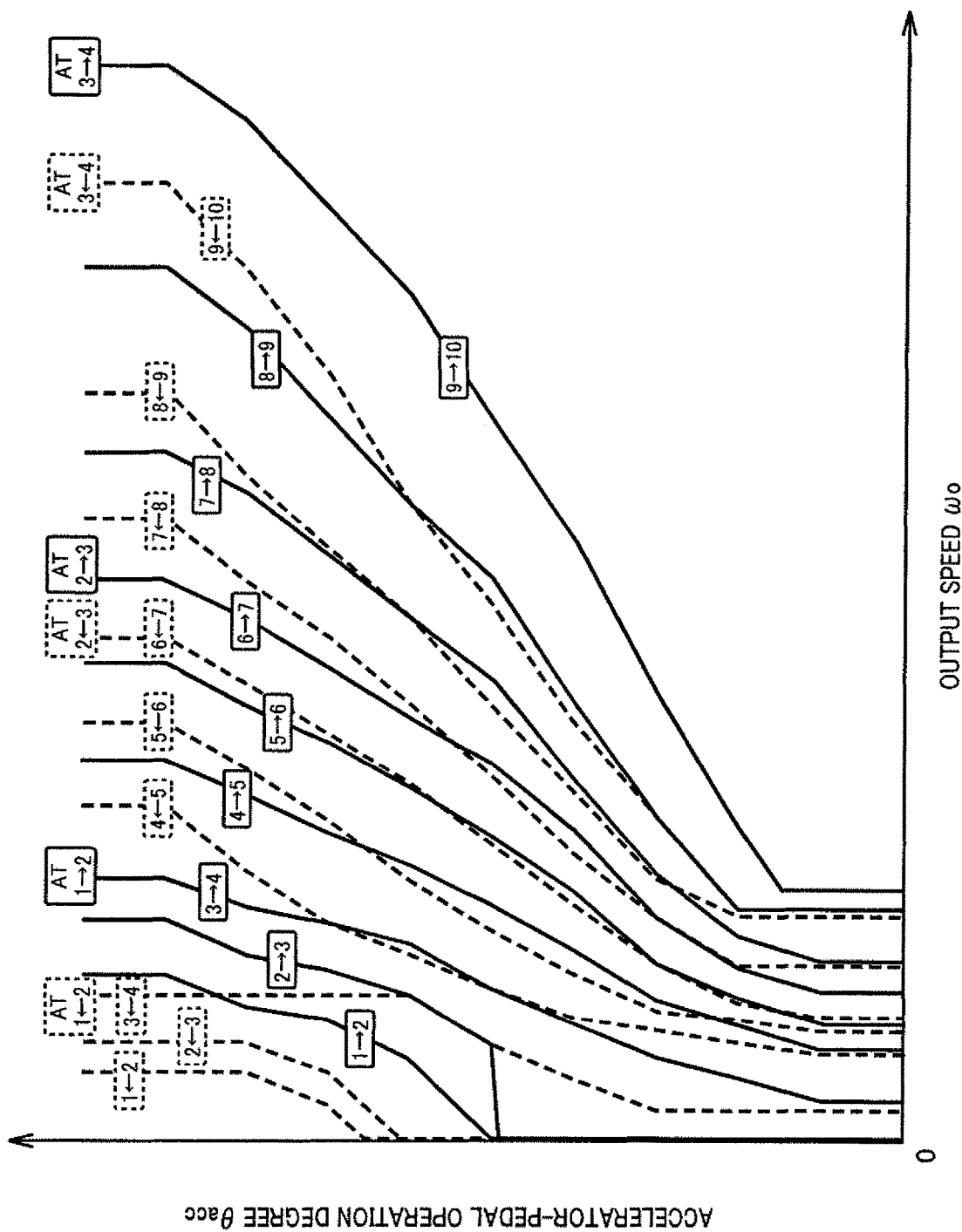
FIG. 6 is a view illustrating an example of an overall speed-position shifting map used to shift up and down the transmission device from each of the overall speed positions to the adjacent position or positions.

Like the AT gear position shifting map, the above-indicated overall speed-position shifting map is a relationship between the output speed ωo and the accelerator-pedal operation degree θacc as parameters. FIG. 6 is the view illustrating an example of the overall speed-position shifting map. In FIG. 6, solid lines indicate shift-up boundary lines while broken lines indicate shift-down boundary lines. The transmission device 40 consisting of the continuously-variable transmission portion 18 and the step-variable transmission portion 20 which are disposed in series with each other is shifted from one of the overall speed positions to another according to the overall speed-position shifting map, as if the transmission device 40 was shifted like a step-variable transmission as a whole. This overall step-variable shifting control to control the shifting actions of the transmission device 40 as the step-variable transmission as a whole may be implemented preferentially to the continuously-variable shifting control of the transmission device 40 as the continuously-variable transmission as a whole, only when a sporty drive mode or any other high-drivability drive mode is selected by the vehicle operator, or only when the required drive torque Tdem is comparatively high, but may be principally implemented except where the overall step-variable shifting control is restricted or inhibited.

The overall step-variable shifting control by the hybrid control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the third overall speed position and the fourth overall speed position, for example, the step-variable transmission portion 20 is shifted between the first speed AT gear position and the second speed AT gear position. When the transmission device 40 is shifted between the sixth overall speed position and the seventh overall speed position, the step-variable transmission portion 20 is shifted between the second speed AT gear position and the third speed AT gear position. When the transmission device 40 is shifted between the ninth overall speed position and the tenth overall speed position, the step-variable transmission portion 20 is shifted between the third speed AT gear position and the fourth speed AT gear position. (See FIG. 4.) Therefore, the AT gear position shifting map is formulated such that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the transmission shifting control portion 82 in response to a determination according to the overall speed-position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine rotating speed ωe, so that the vehicle operator is less likely to uncomfortably recognize a shifting shock of the step-variable transmission portion 20.

The hybrid control portion 84 selectively establishes the motor drive mode or the hybrid drive mode, depending upon running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

There will be described a control operation performed for a coasting shift-down action of the step-variable transmission portion 20. During a power-off shift-down action such as the coasting shift-down action, at a stage at which an engaging torque Tcb of an engaging engagement device (which is to be engaged to establish an AT gear position that is to be established by the shift-down action) is not yet generated, the AT input rotating speed ωi cannot be increased to the post-shifting synchronizing rotating speed ωsyca (i.e., the rotating speed after the shift-down action=the AT output rotating speed ωo*the gear ratio γat of the AT gear position established by the shift-down action). For example, with the engaging torque Tcb of the engaging engagement device being generated, or with the AT input torque Ti being temporarily increased to be higher than a required input torque (required value), the AT input rotating speed ωi can be increased toward the post-shifting synchronizing rotating speed ωisyca whereby the shift-down action can be progressed. In the present embodiment, in the control operation for the coasting shift-down action of the step-variable transmission portion 20, the shift-down action is progressed by temporary increase of the AT input torque Ti at a stage at which the engaging torque Tcb is generated in neither the releasing engagement device nor the engaging engagement device.

The control operation for the coasting shift-down action of the step-variable transmission portion 20 will be described by way of example in which 2→1 coasting shift-down action, i.e., coasting shift-down action to establish, as one of the plurality of gears positions, a first speed AT gear position from a second speed AT gear position, is executed.

In execution of the 2→1 coasting shift-down action, the AT shift control portion 82 causes, as one of the engagement devices E, the releasing engagement device (brake B1) to be released, and makes a torque of the drive power source temporarily higher than a required value so as to temporarily increase the AT input torque Ti inputted to the step-variable transmission portion 20, for thereby increasing the AT input rotating speed ωi toward the post-shifting synchronizing rotating speed ωisyca (i.e., the rotating speed after the shift-down action=the AT output rotating speed ωo*the gear ratio γat1 of the first speed AT gear position established by the shift-down action). Then, when the AT input rotating speed ωi reaches a predetermined rotating speed, the AT shift control portion 82 causes, as another one of the engagement devices E, the engaging engagement device (brake B1) to be engaged. The above-described predetermined rotating speed is a predetermined threshold value of the AT input rotating speed ωi, which is minimally required, for example, to determine that the AT input rotating speed ωi has been increased sufficiently for restraining shock even if the engaging engagement device is quickly engaged as soon as the AT input rotating speed ωi reaches the predetermined rotating speed. The predetermined threshold value as the above-described predetermined rotating speed may be either the post-shifting synchronizing rotating speed ωisyc1 at the first speed AT gear position or a value which is lower than the post-shifting synchronizing rotating speed ωisyc1 and which is close to the post-shifting synchronizing rotating speed ωisyc1.

For making the torque of the drive power source temporarily higher than the required value, it is preferable to make the MG2 torque Tm temporarily larger than a required torque, because the accelerator pedal is a released position during the execution of the coasting shift-down action and because control of the MG2 torque Tm can be made with better controllability and better responsiveness than control of the engine torque Te. The AT shift control portion 82 causes the MG2 torque Tm to be temporarily larger than the required torque (for example, by supplying a command requesting the MG2 torque Tm to be temporarily larger than the required torque, to the hybrid control portion 84 serving as the drive-power source control portion), for thereby making the AT input torque Ti temporarily higher than the required input torque. This required input torque is a torque value of the intermediate power transmitting member 30 obtained by conversion from the required drive torque Tdem. Since the accelerator pedal is in a released position during the execution of the coasting shift-down action, the required input torque is a value that provides a so-called creep torque causing a creep phenomenon in which the vehicle 10 is moved slowly. The required torque (required value) of the drive power source is a required torque of the second motor/generator MG2, which is required to provide the required input torque.

In process of the 2→1 coasting shift-down action, if the AT input torque Ti is kept increased, the one-way clutch F1 could be engaged when the AT input rotating speed ωi is synchronized with the post-shifting synchronizing rotating speed ωisyc1 at the first speed AT gear position, and shock (particularly, synchronization shock) could be generated by the engagement of the one-way clutch F1, before engagement of the above-described another one (brake B2) of the engagement devices E that is disposed in parallel with the one-way clutch F1. For avoiding such a situation, in process of the 2→1 coasting shift-down action, the AT shift control portion 82 causes the AT input torque Ti, which has been temporarily increased, to be reduced, when the AT input rotating speed ωi reaches a second predetermined rotating speed that is lower than the above-described predetermined rotating speed. In this instance, the AT shift control portion 82 causes the torque of the drive power source to be reduced (for example, by supplying a command requesting the MG2 torque Tm to be reduced, to the hybrid control portion 84 serving as the drive-power source control portion), such that the AT input torque Ti is reduced to an upper limit value or lower, wherein the upper limit value is a value predetermined for restraining generation of the synchronization shock. The above-described second predetermined rotating speed is a predetermined value of the AT input rotating speed ωi, which is lower than the post-shifting synchronizing rotating speed ωisyc1 by a predetermined value, and which is close enough to the synchronizing rotating speed ωisyc1, for example, to consider it preferable that a rate of the increase of the AT input rotating speed ωi is reduced when the AT input rotating speed ωi reaches the second predetermined rotating speed. It is noted that the determination as to whether the AT input rotating speed ωi has reached the second predetermined rotating speed may be made depending on whether a predetermined length of time has elapsed since a command requesting execution of the 2→1 coasting shift-down action was outputted.

Figure 8:
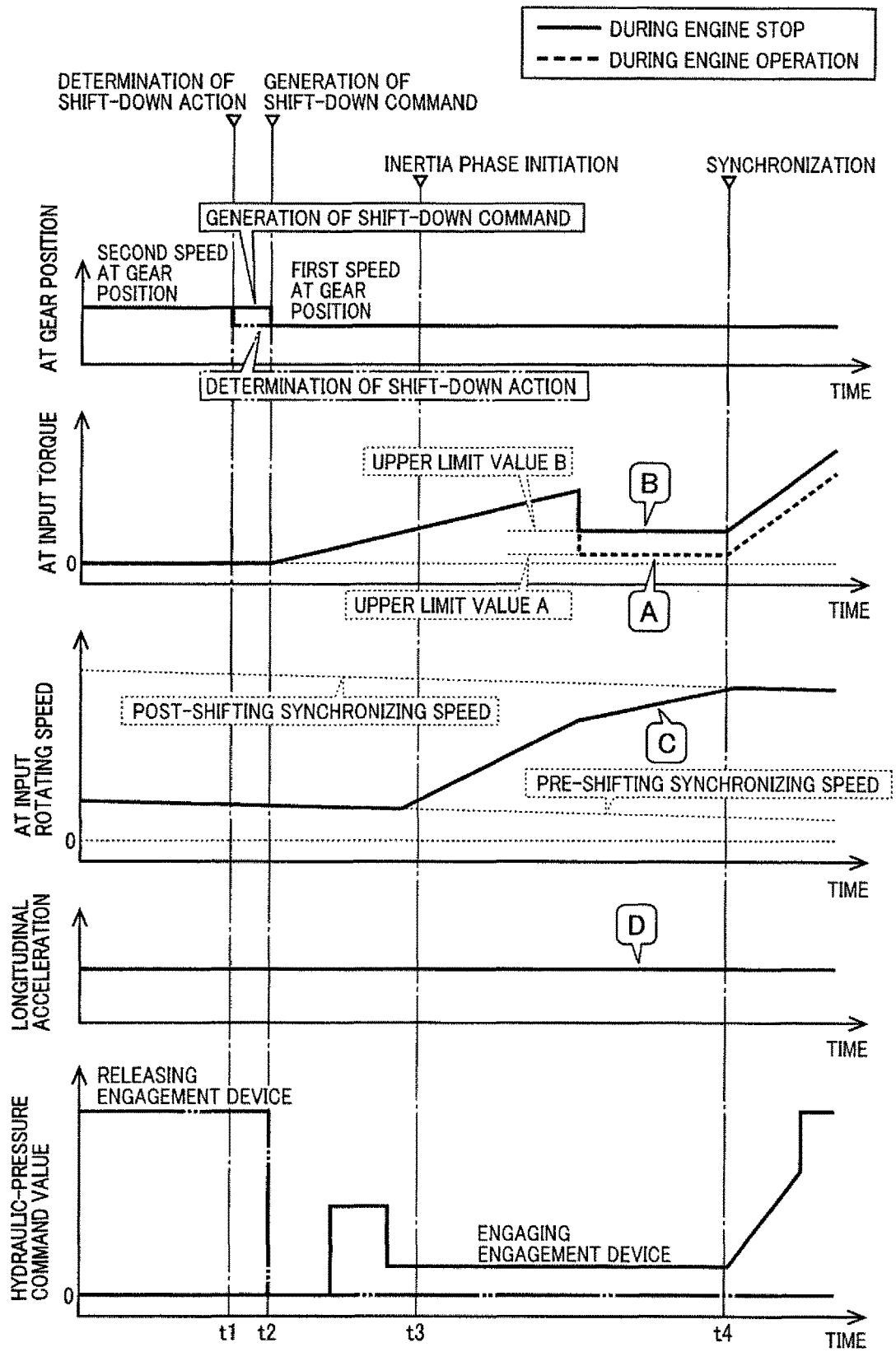
FIG. 8 is an example of a time chart where the control routine illustrated by the flow chart of FIG. 7 is executed.
Figure 9:
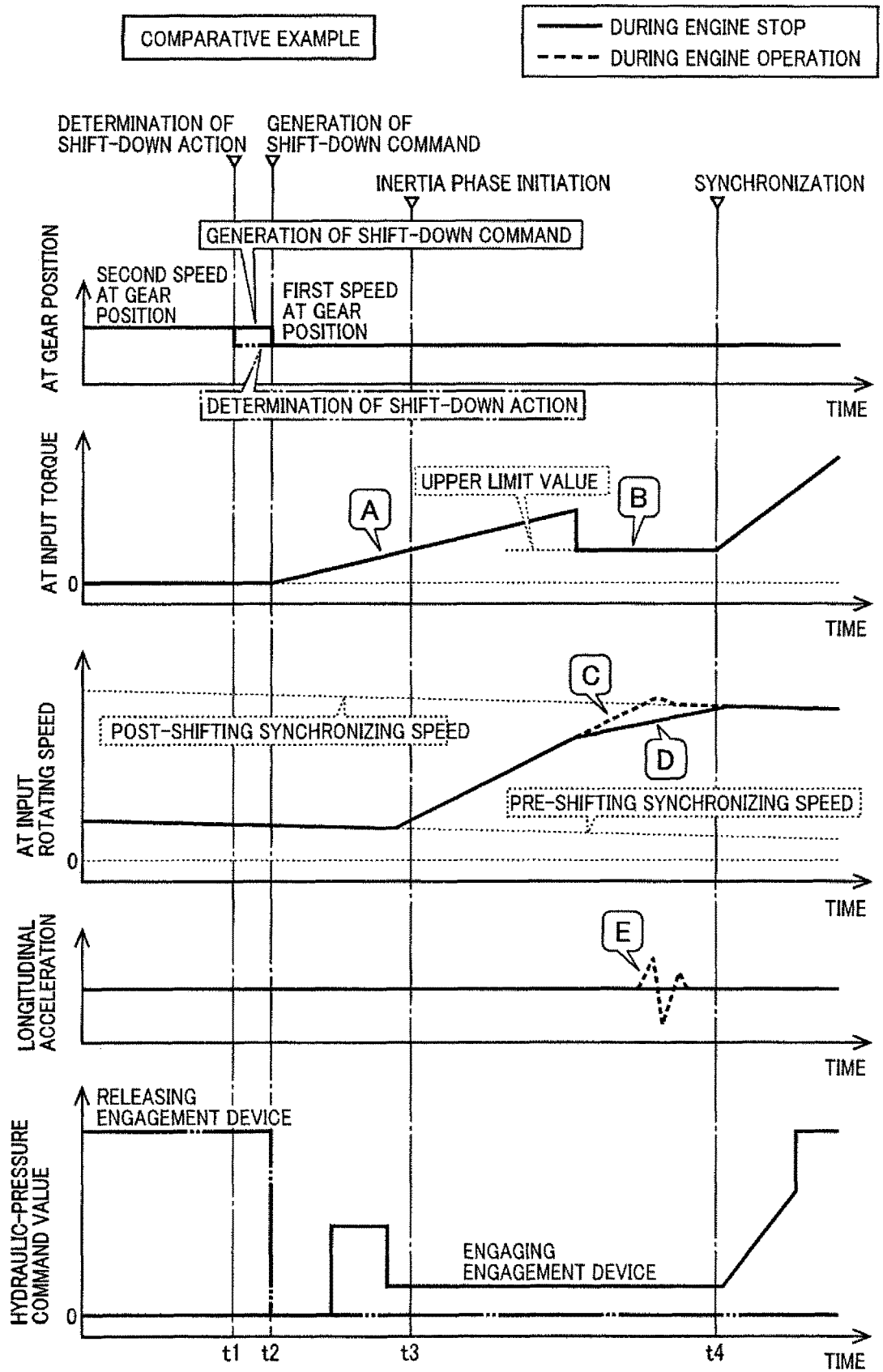
FIG. 9 is an example of a time chart illustrating a control routine executed in 2→1 coasting shift-down action, which is a comparative example in which a same value is set as an upper limit value of AT input torque upon reduction of the AT input torque, irrespective an operating state of the engine, namely, irrespective of whether the engine is stopped or operated.

FIG. 9 is a time chart illustrating a case where a control routine is executed in 2→1 coasting shift-down action in a comparative example. This control routine in the comparative example is different from a control routine in the embodiment of the invention, which is shown in FIG. 8 described below, in that a same value is set as an upper limit value of the AT input torque Ti upon reduction of the AT input torque Ti after the temporary increase of the AT input torque Ti, irrespective an operating state of the engine 14, namely, irrespective of whether the engine 14 is stopped or operated.

In FIG. 9, a point t1 of time indicates a point of time at which it is determined that the 2→1 coasting shift-down action is to be executed (see two-dot chain line in "AT GEAR POSITION COMMAND" in FIG. 9), and a point t2 of time indicates a point of time at which output of command requesting execution of the 2→1 coasting shift-down action is initiated (see solid line in "AT GEAR POSITION" in FIG.

9). When the output of the shift-down command is initiated, a command value of hydraulic pressure for the engaging torque Tcb of the releasing engagement device is quickly reduced (see two-dot chain line in "HYDRAULIC PRESSURE COMMAND VALUE" in FIG. 9), whereby the releasing engagement device is released, and a command value of hydraulic pressure for the engaging torque Tcb of the engaging engagement device is conformed to a pattern required for increasing the hydraulic pressure to initiate an engaging contact of input and output elements of the engaging engagement device, so that the engaging engagement device is placed in its stand-by state for waiting for the engaging torque Tcb that is to be given to the engaging engagement device. Then, in a clutch-free state in which the engaging torque Tcb is given to neither the releasing engagement device nor the engaging engagement device, a torque increase control is executed to make the AT input torque Ti temporarily higher than the required input torque (see part A in FIG. 9) whereby the shift-down action is progressed. Owing to the torque increase control, the AT input rotating speed ωi starts to be increased toward the post-shifting synchronizing rotating speed ωisyc1 at the first speed AT gear position that is to be established by the 2→1 coasting shift-down action, whereby an inertia phase is initiated (see point t3 of time in FIG. 9). If the AT input torque Ti were kept increased, the synchronization shock could be generated by engagement of the one-way clutch F1. Therefore, a torque reduction control is executed to reduce the AT input torque Ti (see part B in FIG. 9) before the AT input rotating speed ωi reaches the post-shifting synchronizing rotating speed ωisyc1. Then, when the AT input rotating speed ωi reaches the predetermined rotating speed, the command value of hydraulic pressure for the engaging torque Tcb of the engaging engagement device is quickly increased whereby the engaging engagement device is engaged (see point t4 of time and thereafter). An inertia of the engine 14 varies depending on an operating state of the engine 14, namely, depending on whether the engine 14 is stopped (see solid line in FIG. 9) or is operated (see broken line in FIG. 9). Thus, even if a controlled value of the AT input torque Ti in the torque reduction control (specifically, an upper limit value of the AT input torque Ti upon reduction of the AT input torque Ti) is set to a same value, the AT input rotating speed ωi, when being increased toward the post-shifting synchronizing rotating speed ωisyca, is changed in a manner that varies depending on whether the engine 14 is operated or stopped, namely, the shift-down action is progressed in a manner that varies depending on the operating state of the engine 14 (see part C and part D in FIG. 9). The AT input torque Ti is increased more easily during operation of the engine 14 (see part C in FIG. 9), than during stop of the engine 14 (see part D in FIG. 9). In other words, the rate of increase of the AT input rotating speed ωi is less likely to be slow during operation of the engine 14 than during stop of the engine 14. Therefore, if the upper limit value of AT input torque Ti upon reduction of the AT input torque Ti is set to a same value irrespective of the operating state of the engine 14, the synchronization shock due to engagement of the one-way clutch F1 is likely to be generated during operation of the engine 14 (see part E in FIG. 9).

Therefore, in the process of the coasting shift-down action of the step-variable transmission portion 20, the AT shift control portion 82 is configured to set the upper limit value of the AT input torque Ti, such that the AT input torque Ti is controlled with the upper limit value being lower during operation of the engine 14 than during stop of the engine 14, for restraining shock irrespective of the operating state of the engine 14.

Specifically, the electronic control device 80 further includes a state determining means or portion in the form of a state determining portion 86, for realizing a control to restrain shock irrespective of the operating state of the engine 14, in execution of the coasting shift-down action of the step-variable transmission portion 20.

The state determining portion 86 determines whether a coasting shift-down action (particularly, the 2→1 coasting shift-down action) is being executed or not. When determining that the coasting shift-down action is being executed, the state determining portion 86 determines whether the engine 14 is being operated or not.

When it is determined by the state determining portion 86 that the coasting shift-down action is being executed with the engine 14 being operated, the AT shift control portion 82 determines the upper limit value of the AT input torque Ti upon reduction of the AT input torque Ti (i.e., the upper limit value of the AT input torque Ti in the torque reduction control that is executed to reduce the AT input torque Ti that has been temporarily increased), such that the determined upper limit value is made lower than when the engine 14 is being stopped. Specifically, when it is determined by the state determining portion 86 that the engine 14 is being operated, the AT shift control portion 82 causes the torque of the drive power source to be reduced (for example, by supplying a command requesting reduction of the MG2 torque Tm, to the hybrid control portion 84), such that the AT input torque Ti is limited (namely, reduced) to an upper limit value A in execution of the torque reduction control in the process of the 2→1 coasting shift-down action. Further, when it is determined by the state determining portion 86 that the engine 14 is being stopped, the AT shift control portion 82 causes the torque of the drive power source to be reduced (for example, by supplying a command requesting reduction of the MG2 torque Tm, to the hybrid control portion 84), such that the AT input torque Ti is limited (namely, reduced) to an upper limit value B in execution of the torque reduction control in the process of the 2→1 coasting shift-down action. The upper limit value A is a value of the AT input torque Ti, which is lower than the upper limit value B, and which is predetermined for restraining the synchronization shock caused by engagement of the one-way clutch F during operation of the engine 14. The upper limit value B is a value of the AT input torque Ti, which is predetermined for restraining the synchronization shock caused by engagement of the one-way clutch F during stop of the engine 14.

Figure 7:
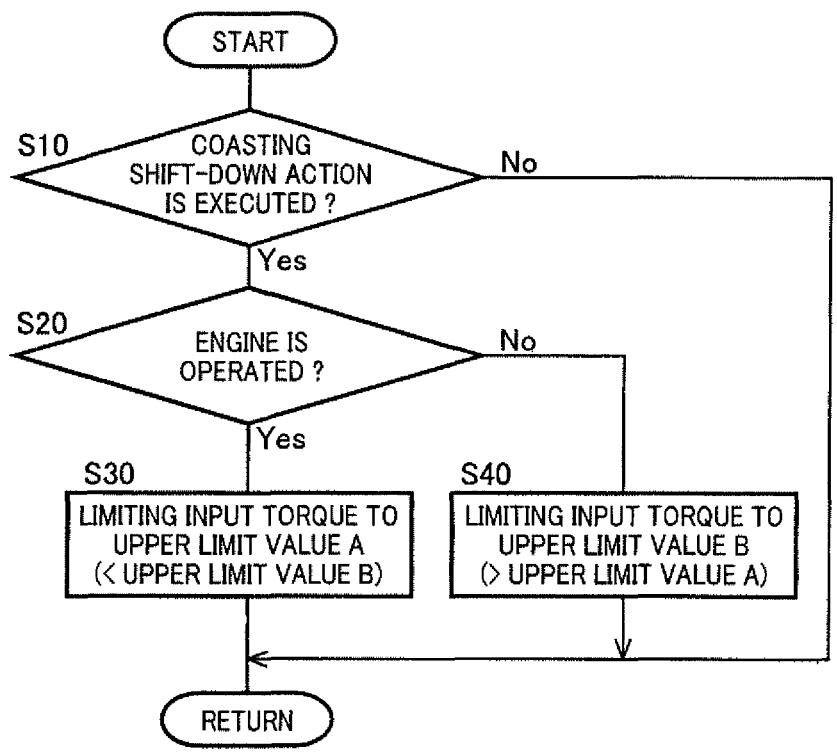
FIG. 7 is a flow chart illustrating an essential part of a main control routine executed by an electronic control device, namely, a control routine that is executed, in execution of a coasting shift-down action, to restrain shock irrespective of an operating state of an engine.

FIG. 7 is a flow chart illustrating an essential part of a main control routine executed by the electronic control device 80, namely, a control routine that is executed, in execution of the coasting shift-down action of the step-variable transmission portion 20, to restrain shock irrespective of the operating state of the engine 14. This control routine is executed, for example, in a repeated manner. FIG. 8 is an example of a time chart where the control routine illustrated by the flow chart of FIG. 7 is executed.

The control routine of FIG. 7 is initiated with step S10 corresponding to function of the state determining portion 86, to determine whether the coasting shift-down action (particularly, the 2→1 coasting shift-down action) is being executed or not. If a negative determination is made at step S10, one cycle of execution of the control routine is terminated. If an affirmative determination is made at step S10, step S20 corresponding to function of the state determining portion 86 is implemented to determine whether the engine 14 is being operated or not. If an affirmative determination is made at step S20, step S30 corresponding to function of the AT shift control portion 82 is implemented whereby the AT input torque Ti upon execution of the torque reduction control in the process of the 2→1 coasting shift-down action is limited to the upper limit value A (<upper limit value B). If a negative determination is made at step S20, the control flow goes to step S40 corresponding to function of the AT shift control portion 82, whereby the AT input torque Ti upon execution of the torque reduction control in the process of the 2→1 coasting shift-down action is limited to the upper limit value B.

FIG. 8 is an example according to the embodiment of the invention in which the upper limit value of the AT input torque Ti upon reduction of the AT input torque Ti that has been temporarily increased, is set to a value that varies depending on whether the engine 14 is stopped or operated. In FIG. 8, a point t1 of time indicates a point of time at which it is determined that the 2→1 coasting shift-down action is to be executed (see two-dot chain line in "AT GEAR POSITION" in FIG. 8), and a point t2 of time indicates a point of time at which output of command requesting execution of the 2→1 coasting shift-down action is initiated (see solid line in "AT GEAR POSITION" in FIG. 8). When the output of the shift-down command is initiated, in the clutch-free state, the torque increase control is executed to temporarily increase the AT input torque Ti whereby the shift-down action is progressed, and the AT input rotating speed ωi starts to be increased toward the post-shifting synchronizing rotating speed ωisyca at the first speed AT gear position that is to be established by the shift-down action, whereby the inertia phase is initiated (see point t3 of time in FIG. 8), as in the comparative example shown in FIG. 9. Then, as in the comparative example shown in FIG. 9, the torque reduction control is executed to reduce the AT input torque Ti (see part A and part B in FIG. 8), before the AT input rotating speed ωi is synchronized with the post-shifting synchronizing rotating speed. When the AT input rotating speed ωi reaches the predetermined rotating speed, the command value of hydraulic pressure for the engaging torque Tcb of the engaging engagement device is quickly increased (see solid line in "HYDRAULIC PRESSURE COMMAND VALUE" in FIG. 8), whereby the engaging engagement device is engaged (see point t4 of time and thereafter). In the present embodiment, unlike in the comparative example shown in FIG. 9, the upper limit value of the AT input torque Ti upon execution of the torque reduction control is set to a value that varies depending on the operating state of the engine 14. The upper limit value of the AT input torque Ti is set to the upper limit value A (see part A in FIG. 8) in case of operation of the engine 14 (see broken line), and is set to upper limit value B (see part B in FIG. 8) in case of stop of the engine 14 (see solid line). The upper limit value A, which is set during operation of the engine 14 during which the AT input torque Ti is more easily increased (namely, the rate of increase of the AT input rotating speed ωi is less likely to be slow) than during stop of the engine 14, is lower than the upper limit value B which is set during stop of the engine 14. Owing to this arrangement, the AT input rotating speed ωi, when being increased toward the post-shifting synchronizing rotating speed ωisyca (at the first speed AT gear position that is to be established by the shift-down action), is changed in substantially the same manner during operation of the engine 14 as during stop of the engine 14 (see part C in FIG. 8). As during stop of the engine 14, during operation of the engine 14, too, the rate of increase of the AT input rotating speed ωi is made slow when the AT input rotating speed ωi becomes close to the synchronizing rotating speed ωisyca, so that generation of the synchronization shock due to engagement of the one-way clutch F1 is restrained (see part D in FIG. 8).

As described above, in the present embodiment, when the AT input torque Ti is to be controlled in process of the coasting shift-down action executed in the step-variable transmission portion 20, the upper limit value of the AT input torque Ti is set to be lower during operation of the engine 14 than during stop of the engine 14. Thus, even during operation of the engine 14 during which the AT input rotating speed ωi in the process of the coasting shift-down action could be easily increased as compared with during stop of the engine 14, it is possible to cause the AT input rotating speed ωi to be changed in substantially the same manner as during stop of the engine 14, for example, increased at substantially the same rate as during stop of the engine. It is therefore possible to restrain shock irrespective of the operating state of the engine 14 in execution of the coasting shift-down action in the step-variable transmission portion 20.

In the present embodiment, in execution of the coasting shift-down action to establish the first speed AT gear position as one of the gear positions, by either (i) release of the releasing engagement device (brake B1) as one of the engagement devices E and engagement of the one-way clutch F1 as another one of the engagement devices E, or (ii) the release of the releasing engagement device (brake B1) and engagement of still another one (brake B2) of the engagement devices E, the AT input rotating speed ωi is increased toward the post-shifting synchronizing rotating speed ωisyc1 at the first speed AT gear position by the torque increase control (by which the AT input torque Ti is temporarily increased) in the clutch-free state, and then the brake B2 is engaged as the AT input rotating speed ωi reaches the predetermined rotating speed, so that the coasting shift-down action to establish the first speed AT gear position can be appropriately progressed. Further, in the process of the coasting shift-down action, the AT input torque Ti is controlled with the upper limit value of the AT input torque Ti being set to be lower during operation of the engine 14 than during stop of the engine 14, so that, during operation of the engine 14, it is possible to cause the AT input rotating speed ωi to be changed in substantially the same manner as during stop of the engine 14, for example, increased at substantially the same rate as during stop of the engine 14, whereby generation of the synchronization shock due to engagement of the one-way clutch F1 can be restrained.

In the present embodiment, in execution of the coasting shift-down action to establish the first speed AT gear position, when the AT input rotating speed ωi reaches the second predetermined rotating speed, the torque reduction control is executed to reduce the AT input torque Ti that has been temporarily increased. Thus, owing to the execution of the torque reduction control, a rate of increase of the AT input rotating speed ωi is made slow for restraining generation of the synchronization shock due to engagement of the one-way clutch F1. Further, the torque reduction control is executed with the upper limit value of the AT input torque Ti being set to be lower during operation of the engine 14 than during stop of the engine 14, so that, during operation of the engine 14, it is possible to cause the AT input rotating speed ωi to be changed in substantially the same manner as during stop of the engine 14, for example, increased at substantially the same rate as during stop of the engine 14, whereby generation of the synchronization shock due to engagement of the one-way clutch F1 can be appropriately restrained.

There will be described another embodiment of this invention. The same reference signs as used in the above-described embodiment will be used in the following embodiment, to identify the functionally corresponding elements, and descriptions thereof are not provided.

Second Embodiment

Figure 10:
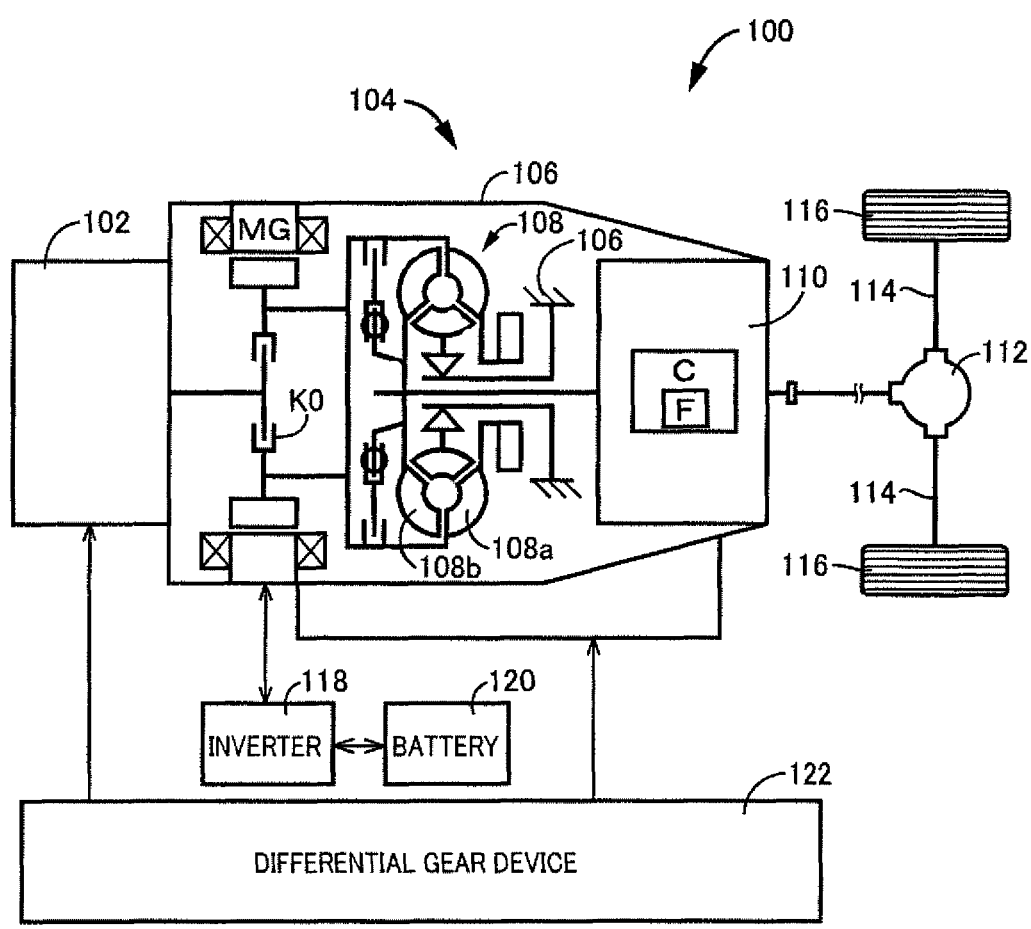
FIG. 10 is a schematic view showing an arrangement of a power transmitting system of a vehicle (that is different from the vehicle shown in FIG. 1) to be controlled by a control apparatus according to the present invention.

In this second embodiment, the control apparatus according to the invention is used for controlling a vehicle 100 shown in FIG. 10, which is different from the vehicle 10 in the first embodiment in which the continuously variable transmission portion 18 and the step-variable transmission portion 20 are connected in series with each other.

As shown in FIG. 10, the vehicle 100 is a hybrid vehicle including an engine 102 serving as a drive power source, a motor/generator (rotating machine) MG also serving as the drive power source, and a power transmitting system 104. The power transmitting system 104 includes a clutch K, a torque converter 108, and an automatic transmission 110, which are disposed within a non-rotatable member in the form of a casing 106 fixed to a body of the vehicle 100, in this order of description as seen in the direction from the engine 102. The power transmitting system 104 further includes a differential gear device 112 and axles 114. The torque converter 108 has a pump impeller 108a selectively connected to the engine 102 through the clutch K0 and directly connected to the motor/generator MG, and a turbine impeller 108b directly connected to the automatic transmission 110. In the power transmitting system 104, a drive force of the engine 102 and/or a drive force of the motor/generator MG are/is transmitted to drive wheels 116 of the vehicle 100 through the clutch K0 (where the drive force of the engine 102 is transmitted), the differential gear device 112 and the axles 114, in this order of description. The automatic transmission 110 is a mechanically-operated transmission mechanism which constitutes a part of a power transmitting path between the drive power source (that is constituted by the engine 102 and the motor/generator MG) and the drive wheels 116, and is a known automatic transmission of a planetary gear type which is configured to establish a selected one of a plurality of gear positions by engagement of at least one of a plurality of engagement devices C that includes a one-way clutch (e.g., sprag clutch) F, as the step-variable transmission portion 20 in the above-described first embodiment. The vehicle 100 further includes an inverter 118, and an electric power storage device in the form of a battery 120 to and from which an electric power is respectively supplied from and to the motor/generator MG through the inverter 118, as well as a control device 122.

The control device 122 is configured to selectively establish a motor drive mode in which the vehicle 100 is driven with only the motor/generator MG operated as the drive power source with electric power supplied from the battery 120 while the engine 102 is held at rest, in the released state of the clutch K0, or a hybrid drive mode in which the vehicle 100 is driven with the engine 102 operated as the drive power source, in the engaged state of the clutch K0. In the hybrid drive mode established by the control device 122, a drive torque generated by the motor/generator MG with the electric power supplied from the battery 120 may be added to the drive force generated by the engine 102, or the motor/generator MG may be operated as an electric generator with the drive force of the engine 102, so that the battery 120 is charged with the electric power generated by the motor/generator MG Thus, the motor/generator MG has a function of an electric motor and a function of an electric generator. An output torque (vehicle driving torque or regenerative torque) of the motor/generator MG is controlled by the inverter 118 under the control of the electric device 122.

The control device 122 has the functions of the transmission shifting control portion 82, hybrid control portion 84 and state determining portion 86, which are incorporated in the electronic control device 80 according to the above-described first embodiment. Like the electronic control device 80, the control device 122 is capable of performing various controls for restraining shock irrespective of the operating state of the engine 102 in execution of a coasting shift-down action.

The present second embodiment has the same advantages as the first embodiment described above.

While the preferred embodiments of this invention have been described in detail by reference to the drawings, it is to be understood that the invention may be otherwise embodied.

In the above-described first embodiment, the upper limit value of the AT input torque Ti, which is set for execution of the torque reduction control in the process of the 2→1 coasting shift-down action of the step-variable transmission portion 20, corresponds to the upper limit value of the input torque inputted to the mechanically-operated transmission mechanism, which is determined to be lower during operation of the engine than during stop of the engine. However, the upper limit value of the input torque inputted to the mechanically-operated transmission mechanism, which is determined to be lower during operation of the engine than during stop of the engine, may be, for example, an upper limit value of the AT input torque Ti, which is set for execution of the torque increase control in the process of the 2→1 coasting shift-down action. This upper limit value of the AT input torque Ti, which is set for execution of the torque increase control is a value that is gradually increased, for example, as the shift-down action is progressed.

The shock, which is generated in execution of the coasting shift-down action in the step-variable transmission portion 20, could be generated not only due to engagement of the one-way clutch F1, but also due to engagement of the engaging engagement device that takes place in an overshoot state in which the AT input rotating speed $\omega i$ has exceeded the post-shifting synchronizing rotating speed $\omega isyca$ at a gear position that is established by the shift down action. In this sense, the gear position, which is to be established by the coasting shift-down action of the step-variable transmission portion 20, is not necessarily have to be a gear position that can be established by engagement of the one-way clutch F1. That is, the present invention is applicable also to a coasting shift-down action to establish a gear position without engagement of the one-way clutch F1. Therefore, the present invention is applicable also to a step-variable transmission portion that does not include a one-way clutch.

In the above-described first embodiment, in execution of the coasting shift-down action of the step-variable transmission portion 20, the shift-down action is progressed by temporary increase of the AT input torque Ti in a clutch-free state in which the engaging torque Tcb is given to neither the releasing engagement device nor the engaging engagement device. However, the coasting shift-down action does not have to be executed necessarily in the clutch-free state. That is, the engaging engagement device may have the engaging torque Tcb during the temporary increase of the AT input torque Ti by which the coasting shift-down action is progressed.

For example, in the above-described first embodiment, the first speed AT gear position of the step-variable transmission portion 20 corresponds to one of the plurality of gear positions which is established by engagement of a one-way clutch. However, the one of the plurality of gear positions which is established by engagement of a one-way clutch may be any one of a plurality of gear positions established in a mechanically-operated transmission mechanism, as long as it is a gear position to be established by engagement of a one-way clutch.

In the above-described first embodiment, the vehicle 10 is provided with the differential mechanism 32 in the form of a planetary gear set of a single-pinion type, and the continuously-variable transmission portion 18 serving as an electrically-controlled transmission mechanism. However, the continuously-variable transmission portion 18 may be a transmission mechanism the differential state of which is limited by controlling a clutch or brake connected to one of the rotary elements of the differential mechanism 32. Further, the differential mechanism 32 may be a planetary gear set of a double-pinion type, or may be replaced by a differential mechanism which includes a plurality of planetary gear sets having four or more rotary elements. Further, the differential mechanism 32 may be replaced by a differential gear device including a pinion rotated by the engine 14, and a pair of bevel gears which mesh with the pinion and to which the first motor/generator MG1 and the intermediate power-transmitting member 30 are respectively connected. Further, the differential mechanism 32 may be replaced by a mechanism which includes two or more planetary gear sets rotary elements of which are connected to each other and/or operatively connected to the engine, motor/generator and drive wheels, in a power transmittable manner.

In the above-described second embodiment, the vehicle 100 may be a vehicle not including the clutch K0. The present invention is applicable to any vehicle that includes (i) an engine serving as a drive power source, (ii) a motor/generator serving as the drive power source and (iii) a mechanically-operated transmission mechanism that constitutes a part of a power transmitting path between the drive power source and drive wheels of the vehicle. While the vehicle 100 uses the torque converter 108 as a fluid-operated power transmitting device, the vehicle 100 may use other types of fluid-operated power transmitting devices such as a fluid coupling, which do not have a torque boosting function. Further, the torque converter 108 need not be provided, or may be replaced by a device having a simple clutch function.

In each of the above-described embodiments, the mechanically-operated transmission mechanism (in the form of the step-variable transmission portion 20 or automatic transmission 110), which constitutes a part of the power transmitting path between the drive power source and the drive wheels, may be any step-variable transmission configured to establish each of a plurality of gear positions by engagement of at least one of a plurality of engagement devices. That is, the step-variable transmission may be, for example, a planetary-gear-type automatic transmission such as the above-described step-variable transmission portion 20, or any other type of automatic transmission such as a known DCT (Dual Clutch Transmission) which is a synchronous meshing parallel two-axes type automatic transmission having two input shafts which are provided with respective engagement devices (clutches) and which are operatively connected to respective two shifting units having respective even-numbered gear positions and odd-numbered gear positions. In the DCT type automatic transmission, engagement devices each connecting to respective inputs of the two shifting units correspond to ones of the plurality of engagement devices, by engagement of which each of the plurality of gear positions is established.

In the above-described first embodiment, the ten overall speed positions are established for the four AT gear appositions. Although the number of the overall speed positions may be equal to the number of the AT gear positions, the number of the overall speed positions is preferably larger than the number of the AT gear positions, for instance, twice or more of the number of the AT gear positions. The numbers of the AT gear positions and the overall speed positions are suitably determined, as long as the step-variable transmission portion is shifted such that the rotating speed of the intermediate power-transmitting member 30 and the operating speed of the second motor/generator MG2 connected to the intermediate power-transmitting member 30 are held within respective predetermined ranges, and the transmission device 40 is shifted such that the engine speed we is held within a predetermined range.

In the above-described first embodiment, the transmission device 40 as a whole is shifted to a selected one of the overall speed positions, like a step-variable transmission, according to the overall speed position shifting map. However, the transmission device 40 may be shifted to the selected overall speed position according to an operation of the shift lever 56, a shift-up/shift-down switch or any other member operated by the vehicle operator to shift the transmission device 40.

It is to be understood that the embodiments described above are given for illustrative purpose only, and that the present invention may be embodied with various modifications and improvements which may occur to those skilled in the art.

NOMENCLATURE OF ELEMENTS

10: vehicle
14: engine (drive power source)
18: electrically-controlled continuously-variable transmission portion (electrically-controlled transmission mechanism)
20: mechanically-operated step-variable transmission portion (mechanically-operated transmission mechanism, automatic transmission)
28: drive wheels
30: intermediate power-transmitting member (output rotary member of electrically-controlled transmission mechanism)
32: differential mechanism
80: electronic control device (control apparatus)
82: AT shift control portion (shift control portion)
B1: brake (releasing engagement device)
B2: brake (another engagement device)
E: engagement device
F1: one-way clutch
MG1: first motor/generator
MG2: second motor/generator (drive power source, motor/generator)
100: vehicle
102: engine (drive power source)
110: automatic transmission (mechanically-operated transmission mechanism)

116: drive wheels
122: control device
C: engagement device
F: one-way clutch
MG: motor/generator (drive power source)

What is claimed is:

1. A control apparatus for a vehicle that includes (i) an engine serving as a drive power source, (ii) a motor/generator serving as the drive power source and (iii) a mechanically-operated transmission mechanism that constitutes a part of a power transmitting path between the drive power source and drive wheels of the vehicle, said control apparatus comprising:

an electronic control unit that is configured, when an input torque inputted to the mechanically-operated transmission mechanism is to be controlled in process of a coasting shift-down action executed in the mechanically-operated transmission mechanism, to determine an upper limit value of the input torque inputted to the mechanically-operated transmission mechanism in the process of the coasting shift-down action, such that the determined upper limit value is lower during operation of the engine than during stop of the engine, wherein:

the mechanically-operated transmission mechanism is an automatic transmission configured to establish each of a plurality of gear positions by engagement of at least one of a plurality of engagement devices including an one-way clutch, the coasting shift-down action is a shift-down action to establish one of the plurality of gear positions in the mechanically-operated transmission mechanism, by either (i) release of a releasing engagement device as one of the engagement devices and engagement of the one-way clutch as another one of the engagement devices, or (ii) the release of the releasing engagement device and engagement of still another one of the engagement devices that is disposed in parallel with the one-way clutch, and when the coasting shift-down action is to be executed, the electronic control unit is configured to cause the releasing engagement device to be released, and to make a torque of the drive power source temporarily higher than a required value so as to temporarily increase the input torque inputted to the mechanically-operated transmission mechanism, for thereby increasing an input rotating speed of the mechanically-operated transmission mechanism toward a synchronizing rotating speed at said one of the plurality of gear positions, such that the electronic control unit causes said still another one of the engagement devices to be engaged as the input rotating speed of the mechanically-operated transmission mechanism reaches a predetermined rotating speed.

2. The control apparatus according to claim 1, wherein when the coasting shift-down action is to be executed, the electronic control unit is configured to reduce the temporarily increased input torque inputted to the mechanically-operated transmission mechanism as the input rotating speed of the mechanically-operated transmission mechanism reaches a second predetermined rotating speed that is lower than the predetermined rotating speed, such that the upper limit value of the input torque upon reduction of the input torque is lower during operation of the engine than during stop of the engine.

3. The control apparatus according to claim 1, wherein the vehicle includes an electrically-controlled transmission mechanism including a differential mechanism to which the engine is connected in a power transmittable manner, and a first motor generator connected to the differential mechanism, such that a differential state of the differential mechanism is controlled with an operating state of the first motor/generator being controlled, and the motor/generator serving as the drive power source is a second motor/generator that is connected to the electrically-controlled transmission mechanism in a power transmittable manner.

4. The control apparatus according to claim 1, wherein the electronic control unit is further configured, in the process of the coasting shift-down action, to control the input torque inputted to the mechanically-operated transmission mechanism, by controlling a torque of the drive power source in accordance with commands supplied from said electronic control unit.

5. The control apparatus according to claim 2, wherein the electronic control unit is further configured, in the process of the coasting shift-down action, to control the input torque inputted to the mechanically-operated transmission mechanism, by controlling the torque of the drive power source in accordance with commands supplied from said electronic control unit, such that the input torque is temporarily increased and then reduced to be not higher than the upper limit value that is determined, by said electronic control unit, to be lower during operation of the engine than during stop of the engine.

* * * * *